(12) United States Patent
Reichle et al.

(10) Patent No.: US 11,526,257 B2
(45) Date of Patent: *Dec. 13, 2022

(54) METHOD FOR DISPLAYING APPARATUS INFORMATION, AND DISPLAY DEVICE

(71) Applicant: SEW-EURODRIVE GMBH & CO. KG, Bruchsal (DE)

(72) Inventors: Robert Reichle, Stutensee (DE); Manfred Gaul, Kronau (DE); Daniel Reinhardt, Weil der Stadt (DE); Stephan Nicklis, Ober-Ramstadt (DE); Desiree Nissel, Oberhausen-Reinhausen (DE); Stephan Schneider, Bruchsal (DE); Rima Pfetzing, Bruchsal (DE); Anne Schilling, Karlsruhe (DE); Christian Hornung, Muggensturm (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,803

(22) Filed: Feb. 8, 2022

(65) Prior Publication Data

US 2022/0164074 A1 May 26, 2022

Related U.S. Application Data

(63) Continuation of application No. 17/229,268, filed on Apr. 13, 2021, now Pat. No. 11,243,666, which is a
(Continued)

(30) Foreign Application Priority Data

Dec. 23, 2013 (DE) .......................... 102013021794.6
May 9, 2014 (DE) .......................... 102014006701.7

(51) Int. Cl.
*G06F 3/0482* (2013.01)
*G06F 16/904* (2019.01)
(Continued)

(52) U.S. Cl.
CPC .......... *G06F 3/0482* (2013.01); *G05B 19/00* (2013.01); *G06F 3/14* (2013.01); *G06F 16/904* (2019.01);
(Continued)

(58) Field of Classification Search
CPC .... G06F 3/04842; G06F 3/14; G06F 16/9027; G06F 16/904; G06Q 10/06; G06Q 10/10; G05B 19/00
See application file for complete search history.

(56) References Cited

U.S. PATENT DOCUMENTS

| 7,203,701 | B1 | 4/2007 | Packebush et al. |
| 7,317,959 | B2 | 1/2008 | Pfander et al. |
| (Continued) | | | |

FOREIGN PATENT DOCUMENTS

DE 10161114 A1 7/2003

OTHER PUBLICATIONS

European Office Action mailed from the European Patent Office and issued to counterpart Application No. 14821511.4 dated Apr. 8, 2020, 18 pages.
(Continued)

*Primary Examiner* — Seth A Silverman
(74) *Attorney, Agent, or Firm* — Carter, DeLuca & Farrell LLP

(57) ABSTRACT

A display device displays device information in a navigation tree, whose nodes are each assigned to apparatus parts, apparatuses and/or apparatus groups, such that the apparatus information with a node that is superordinate both to the
(Continued)

node which is assigned to a source of the apparatus information, and to a currently selected node.

30 Claims, 4 Drawing Sheets

Related U.S. Application Data continuation of application No. 15/107,093, filed as application No. PCT/EP2014/003428 on Dec. 18, 2014, now Pat. No. 10,976,893.

(51) Int. Cl.
  *G06Q 10/06* (2012.01)
  *G06Q 10/10* (2012.01)
  *G05B 19/00* (2006.01)
  *G06F 16/901* (2019.01)
  *G06F 3/14* (2006.01)

(52) U.S. Cl.
  CPC ......... *G06F 16/9027* (2019.01); *G06Q 10/06* (2013.01); *G06Q 10/10* (2013.01)

(56) References Cited

U.S. PATENT DOCUMENTS

| | | |
|---|---|---|
| 2003/0056199 A1 | 3/2003 | Li et al. |
| 2006/0085435 A1 | 4/2006 | Farn |
| 2012/0198382 A1 | 8/2012 | Bogusky et al. |
| 2013/0201192 A1 | 8/2013 | Kanda |
| 2013/0307854 A1 | 11/2013 | Nora et al. |

OTHER PUBLICATIONS

Office Action issued in European Patent Application No. 14821511.4, dated Sep. 30, 2019, 6 pages.
International Search Report, dated Apr. 21, 2015, issued in corresponding International Application No. PCT/EP2014/003428.
International Preliminary Report on Patentability and Written Opinion issued in corresponding International Application No. PCT/EP2014/003428, dated Jul. 14, 2016.

METHOD FOR DISPLAYING APPARATUS INFORMATION, AND DISPLAY DEVICE

CROSS-REFERENCE TO RELATED APPLICATIONS

The present application is a continuation of U.S. patent application Ser. No. 17/229,268, filed on Apr. 13, 2021, which is a continuation of U.S. patent application Ser. No. 15/107,093, filed on Jun. 21, 2016, U.S. Pat. No. 10,976, 893, issued on Apr. 13, 2021, which is the national stage of PCT/EP2014/003428, having an international filing date of Dec. 18, 2014, and claims priority to Application Nos. 102014006701.7, filed in the Federal Republic of Germany on May 9, 2014 and 102013021794.6, filed in the Federal Republic of Germany on Dec. 23, 2013, each of which is expressly incorporated herein in its entirety by reference thereto.

FIELD OF THE INVENTION

The present invention relates to a method for displaying apparatus information, and a display device.

BACKGROUND INFORMATION

It is conventional to bring together and display apparatus information of plants in master displays. In so doing, it is customary to map a schematic representation of the monitored plant on a master display, and to display apparatus information such as status messages, command acknowledgments, error messages and so forth on the master display assigned to the specific part of the plant to which the apparatus information relates. In the case of complex plants, very large master displays are used for this purpose. As a rule, these master displays are structured by combining individual parts of the plant to form groups, subgroups and the like.

SUMMARY

Example embodiments of the present invention simplify the technical requirements for monitoring and controlling a plant.

Among features of a method for displaying apparatus information in a navigation tree—the navigation tree having nodes that are interlinked by directional links, the directional links defining an order structure that includes superordinate nodes and subordinate nodes for each node, the order structure defining for each node an assigned navigation path which preferably contains all superordinate nodes for this node and the respective connecting links, each node being assigned an apparatus part, an apparatus or an apparatus group of a plant that in each case transmit apparatus information, and one node being displayable as selected node with the associated navigation path and the nodes directly subordinate to the node, on a display unit—are that one node is displayed as a selected node with the associated first navigation path and the nodes directly subordinate to the node on the display unit, that the associated node is identified automatically for apparatus information sent by an apparatus part, an apparatus or an apparatus group, that an associated second navigation path is ascertained automatically for the identified node, that one node in the second navigation path which is presently displayed on the display unit is ascertained automatically, and that the apparatus information is displayed on the display unit in a manner assigned automatically to the ascertained node. Thus, a compact master display is able to be provided, in which it is not necessary that every detail of the plant be imaged at every moment. Consequently, navigation in the navigation tree is facilitated for the user by the positioned display of this apparatus information in the navigation tree. The user is thus guided by the placement of the apparatus information. Large master displays are dispensable, and the apparatus information is nevertheless displayable in a manner properly assigned as regards content.

It is also considered advantageous that clarity is improved. Thus, the position of the selected node within the plant hierarchy is easily recognizable.

The plant may be a production plant, a purifying plant, a sorting plant, a conveying plant, a processing plant, or any other industrial plant using drive technology and/or having electronic measuring units, control units and/or regulating units.

The quantity of apparatuses of the plant may include at least drive units, gear units, electronic control units, converters, sensor units, actuating units and/or other apparatuses preferably controllable and/or able to be monitored electronically. For instance, the apparatus parts are realizable as components of these apparatuses, e.g., control cards, electronic modules and/or mechanical, hydraulic, pneumatic and/or chemical modules. The apparatus groups are formable, e.g., by an interaction, by interrelated or identical functions, by one common installation site or by other associations of the apparatuses included.

The node of the second navigation path may be determined as an ascertained node for which no subordinate node in the second navigation path is displayed at the moment.

This is considered advantageous because a branching of the navigation tree relevant for the apparatus information may be made visible or obvious for a user by selecting this node.

Each node may have exactly or no more than one directly superordinate node in the navigation path. An advantage is that a change to a superordinate hierarchy level is achievable. This facilitates implementation of the method in a computer, since additional secondary conditions are dispensable.

The navigation path may be ascertained in a manner that a directly superordinate node in each case is automatically searched for recursively and noted as element of the navigation path. Thus, the navigation path (also called hierarchical path) is able to be built up in computer-implemented fashion, thus without assistance of the user or blindly. Therefore, the navigation paths do not have to be stored separately for each node, but rather are derivable from the navigation tree.

Upon a change of the selected node on the display unit, one node in the second navigation path which is presently displayed on the display unit may again be ascertained automatically, and the apparatus information may be displayed on the display unit in a manner assigned automatically to the newly ascertained node. An advantage is that the apparatus information is allowed to migrate along during navigation in the navigation tree. Therefore, the user is able to be guided with the aid of the apparatus information until the identified node is reached. This arrangement provide the advantage that this identified node does not have to be displayed initially, but rather, to simplify the display, is able to be hidden without the apparatus information getting lost.

The apparatus information may be displayed on a link to a node which is directly superordinate to the ascertained node. Alternatively or additionally, the apparatus information may be displayed on the ascertained node. This is considered advantageous because the apparatus information is able to be made visible where the user is orienting himself during navigation in the navigation tree. Therefore, space on the display unit may be well utilized.

The navigation tree may have a start node for which no superordinate node exists, and to which the remaining nodes in the navigation tree are subordinate. An advantage is that a natural starting point is provided for the navigation. Another advantage is that an end of the recursive construction of the respective navigation path described is easily recognizable, since all navigation paths must end at the start node.

With the selected node, a read-out device is displayed for reading out apparatus parameters of the assigned apparatus part, apparatus or apparatus group. Preferably, the read-out device may include a graphic device, e.g., masks, windows, overlays, etc. An advantage in this case is that instantaneous information, data and parameters of the parts of the plant are able to be presented in a manner assigned correctly as regards content.

Alternatively or additionally, a control device may be displayed for controlling the assigned apparatus part, apparatus or apparatus group. Preferably, the control device is formed by a graphic device, e.g., by command buttons, hyperlinks, etc. An advantage is that the control device is assignable to the particular intended node in an easily recognizable manner. This facilitates operability by untrained personnel.

For each unselected node displayed, no more than two directly subordinate or superordinate nodes are displayed. An advantage is that branchings in the navigation tree are able to be hidden and/or blanked for display on the display unit. In each case, preferably only one link is displayed at the start node, and at the node directly subordinate to the respective selected node. Nodes directly subordinate or superordinate to a node are thus characterizable nodes which are linked to the first-named node via precisely one link, without a further node thus being located in-between.

Among features of a display device for apparatus information—having a storage device in which a navigation tree is stored, the navigation tree having nodes that are interlinked by directional links, the directional links defining an order structure which characterizes superordinate nodes and subordinate nodes for each node, the order structure defining for each node an assigned navigation path that contains all superordinate nodes for this node and the respective connecting links, each node being assigned an apparatus part, an apparatus or an apparatus group of a plant which in each case transmit apparatus information, a selection device being adapted to select one node displayed on the display device and the display device being equipped to display a selected node of the navigation tree with the associated navigation path and the nodes directly subordinate to the node—are that an information input is formed, via which apparatus information transmitted from the apparatus part, the apparatus or the apparatus group is receivable, that an identification device is equipped to identify a node assigned to apparatus information received, that a navigation-path calculating device is furnished to ascertain the navigation path to an identified node, that a node-selection device is equipped to ascertain one node in the navigation path to the identified node, which at the same time is also currently displayed on the display unit, and that an information-output device is furnished for the display of the apparatus information with the ascertained node on the display unit. This is considered advantageous because it permits a computer-implemented support of a location-accurate display of apparatus information. For the user, it is therefore immediately recognizable, which part of a plant is affected by the apparatus information. The display unit may therefore be much smaller than, for example, a master display. For many purposes, a PC-, or laptop-, or netbook-, or tablet PC-display is sufficient as a display unit. For instance, the selection device may be formed by a pointing device, a touch-sensitive and/or light-sensitive display, etc.

The user may follow the virtual navigation path in the real plant and may thus arrive easily at the source of the apparatus information. To that end, the method is executable on a portable computer, e.g., a smart phone, a tablet PC, a netbook or a laptop. Consequently, a navigation path is able to be updated while the user is finding the source of the apparatus information. It is especially beneficial if the portable computer is set up to ascertain an instantaneous location in the real plant. An advantage is that a cross-check with a display of the selected node and/or a display of the navigation path is achievable in automated fashion. Thus, in automated fashion, a movement of the user toward the source of the apparatus information is able to be imaged simultaneously by altering a display of the navigation path. Orientation of the user in confusing plants is therefore able to be assisted, e.g., by computer-generated navigation instructions.

A node-selection device may be provided to ascertain the node in the navigation path to the identified node, for which no subordinate node in this navigation path is displayed at the moment. An advantage in so doing is that the node at which the route, given by the apparatus information, to the identified node branches off from the currently displayed path is selectable and is selected automatically.

Each node may have exactly or no more than one directly superordinate node in the navigation tree. This is considered advantageous because the recursion method described for constructing the navigation path is achievable in computer-implemented fashion, e.g., automatically.

The navigation-path calculating device may be adapted for a recursive automatic ascertainment of one node directly superordinate in each case to a node, and for noting the superordinate node as element of the navigation path. An advantage is that a connection to a start node is ascertainable automatically without a user having to intervene. Consequently, an overlap between a first navigation path currently being displayed on the display unit, with a second navigation path that belongs to the apparatus information is able to be calculated in an easy manner.

The display device, in response to a change of the selected node on the display unit, may be adapted to again automatically ascertain a node, currently displayed on the display unit, in the navigation path of the identified node, and to display the apparatus information in a manner assigned to the newly ascertained node. This is considered advantageous because it permits constant updating. Thus, the apparatus information is able to be carried along with the navigation.

The display device may be adapted to display the apparatus information on a link to a node which is directly superordinate to the ascertained node. Alternatively or additionally, the display device is adapted to display the apparatus information on the ascertained node. An advantage in this case is that the apparatus information is usable directly for guiding the user during navigation.

The navigation tree may have a start node for which no superordinate node exists, and to which the remaining nodes in the navigation tree are subordinate. Thus, for each node, in each case one navigation path is able to be established that ends at the start node. The case where two established navigation paths have no node in common is therefore avoidable.

The display device may be adapted for the display of a read-out device for reading out apparatus parameters of the assigned apparatus part, apparatus or apparatus group with the selected node. To that end, the display unit is able to be furnished with a suitably equipped control device. This offers the advantage that a status of a part of the plant represented by the selected node is able to be called up and displayed. Therefore, the method is usable as sub-step in a method for the read-out of an apparatus part, an apparatus and/or an apparatus group as practical application. Preferably, the read-out device is formed as graphic read-out device, e.g., as masks, tables, graphics, etc. Alternatively or additionally, the display device is adapted to display a control device for a control of the assigned apparatus part, apparatus or apparatus group. To that end, the display unit is able to be furnished with a suitably equipped control device. An advantage is that a part of the plant represented by the selected node is operable via the display device, particularly in reaction to the apparatus information. Preferably, the control device is formed as graphic control device, e.g., as masks, tables, graphics, positioning of command buttons, etc.

The navigation tree may have a start node for which no superordinate node exists, and to which the remaining nodes in the navigation tree are subordinate. This is considered advantageous because a reference point is able to be furnished for the navigation tree. By reaching the start point, a termination criterion for a recursive construction of a navigation tree is also definable.

The display device may be adapted to display no more than two nodes directly subordinate or superordinate to each unselected node displayed. Preferably, the display device and especially an assigned control device are equipped to select the node and links to be displayed at the moment and to hide or eliminate the nodes and links not to be displayed at the moment. An advantage in so doing is that the navigation tree is easily able to be simplified automatically for a display.

Preferably, the apparatus information is, for example, a status message, a command confirmation, an error message, an action instruction and/or other apparatus-specific information.

Advantageously, the apparatus information is displayed as marking of a link and/or a node or rather is furnished for that purpose. In this context, advantageously, the associated node and/or link is automatically displayed enlarged or is enlarged. This makes it possible to recognize the apparatus information more easily and/or to offer additional data, parameters and/or information.

It is especially beneficial if the method, especially as already described and/or according to the following description, is used with a display device, particularly as already described and/or according to the following description. Alternatively or additionally, the display device is adapted to implement the method hereof, especially as previously described and/or according to the following description. For instance, a checking device may be provided to ascertain corresponding nodes in two or more navigation paths. Thus, it is easy to ascertain automatically, at which node apparatus information that relates to a node in a node not completely shown, is displayable.

Example embodiments of the present invention are described in greater detail below with reference to the appended Figures.

DETAILED DESCRIPTION

Figure 1:
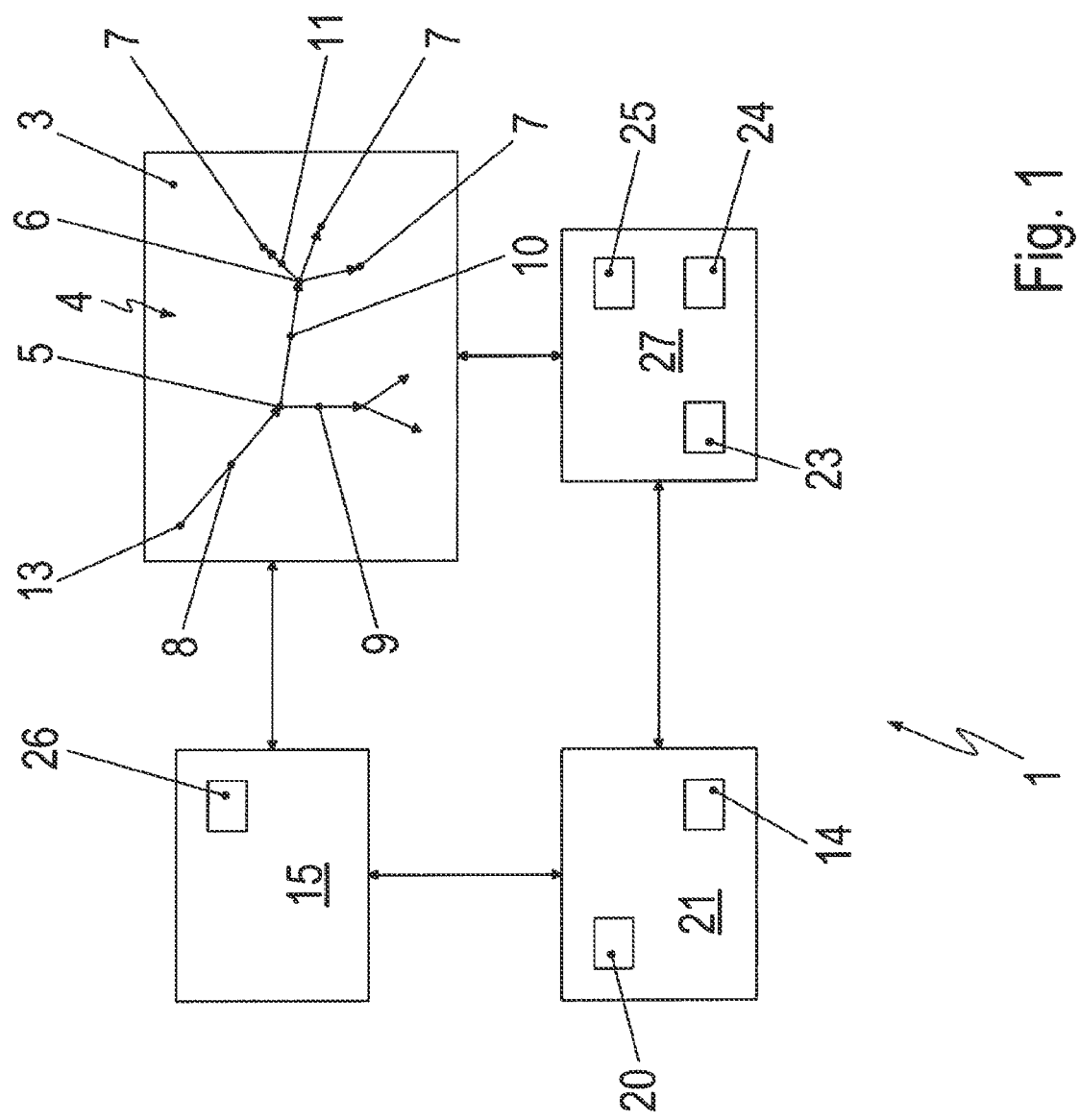
FIG. 1 schematically illustrates a display device according to an example embodiment of the present invention.

A display device according to an example embodiment of the present invention, denoted as a whole by 1, is furnished to display device information 2 as follows:

According to FIG. 1, display device 1 has a storage device 3, in which a navigation tree 4 is stored and made available.

In this context, a navigation tree is understood to be a hierarchical data structure that is displayable, at least in cutaway portions, with the aid of the display device. For instance, a hierarchy is able to be mapped by a direction of the links between the nodes.

For example, apparatus information 2 is an error message, a warning note, a command confirmation or a status-change message. Apparatus information 2 is displayable preferably as a symbol in navigation tree 4. By preference, a separate symbol is assigned to each type of apparatus information.

Navigation tree 4 has nodes 5, 6, 7, each of which is assigned to an apparatus part, an apparatus or an apparatus group 16, here, for example, a motor, of a plant. Navigation tree 4 also has further nodes and links which are not denoted or shown here for the sake of simplification.

For instance, node 5 is assigned to an apparatus group, while node 6 is assigned to an apparatus from this apparatus group and node 7 is assigned to an apparatus part of this apparatus.

Nodes 5, 6, 7 are linked to each other in pairs by links 8, 9, 10, 11. Links 8, 9, 10, 11 are directional, and by their direction, define subordinate and superordinate notes 5, 6, 7. For instance, node 5 is superordinate to node 6. Nodes 7, for example, are each subordinate to node 6. On the other hand, node 6 is subordinate to node 5.

In each case exactly one superordinate node 5, 6, 7 exists for each node 5, 6, 7. On the other hand, a plurality of subordinate nodes 5, 6, 7 are possible for a node 5, 6, 7. Thus, node 6 has three subordinate nodes 7.

The succession of superordinate nodes 5, 6 to a node 7 defines a navigation path 12.

Navigation path 12 is free of branchings and always ends at a start node 13.

A node 5, 6 superordinate to another node 7 is thus located hierarchically between other node 7 and start node 13.

Nodes 5, 6, 7 are selectable by a selection device 14. Selection device 14 is part of an input device 21 which, to assist in the selection, makes a pointer 20 available by which it is possible to point to screen contents on display unit 15.

Preferably, input device 21 is arranged as a computer mouse, a touchpad or a trackball.

Figure 2:
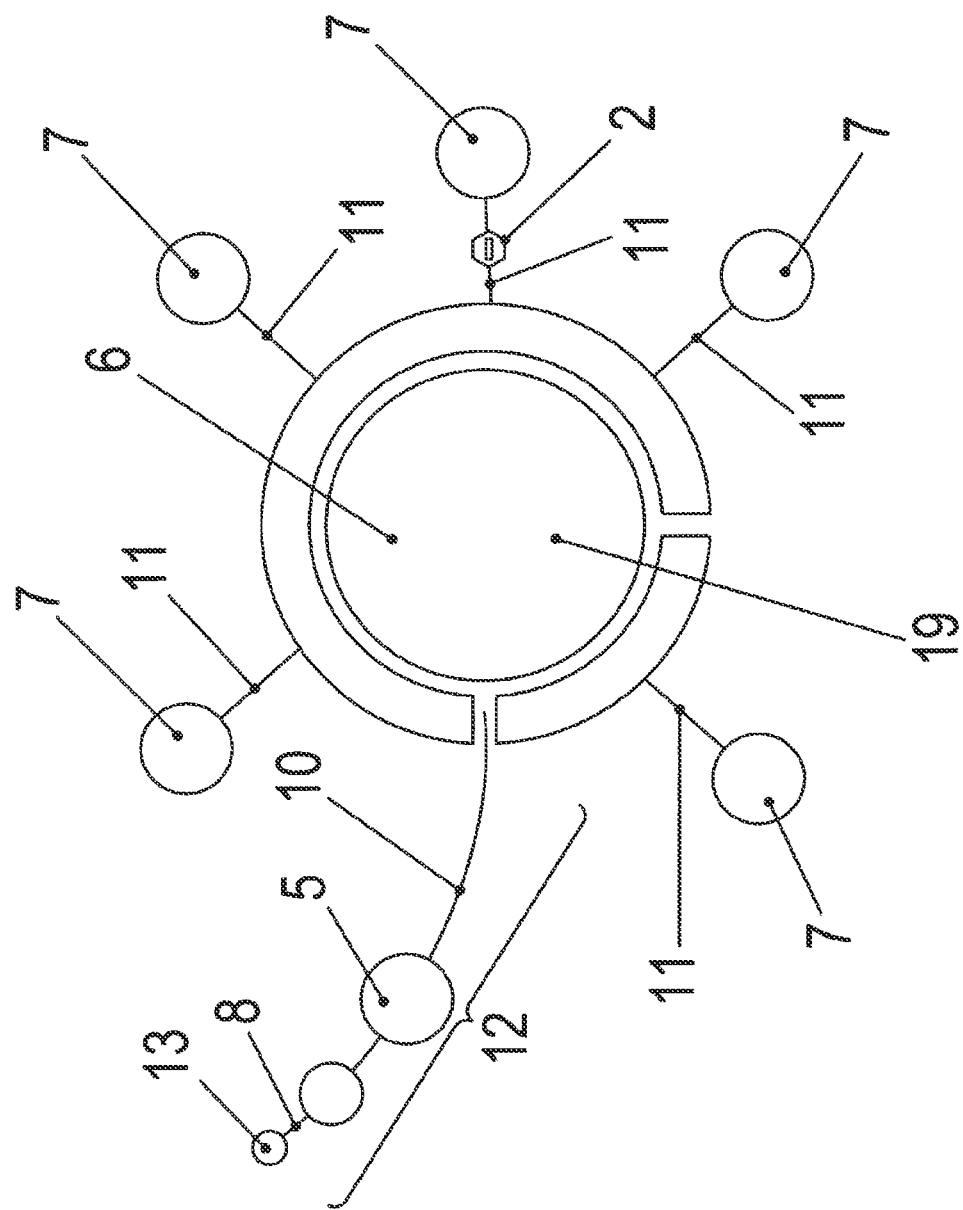
FIG. 2 shows a representation of apparatus information in a part of a navigation tree in the case of a method according to an example embodiment of the present invention.

After a node 6 has been selected, the situation from FIG. 2 results for example. The display of selected node 6 on display unit 15 is shown.

Selected node 6 is displayed together with its associated navigation path 12, as well as nodes 7 subordinate to it and respective associated links 8, 10, 11. Link 9 does not belong to navigation path 12, and is therefore not shown on display unit 15.

Nodes 7 subordinate to selected node 6 are shown reduced. Thus, no nodes subordinate to these nodes 7 are displayed, even though such nodes are possible in navigation tree 4.

A control device 27 has an information input 22, via which apparatus information 2 is received from the apparatus parts, apparatuses and/or apparatus groups 16. To that end, information input 22 is connectable via a bus system to the components of the plant.

If an apparatus part, an apparatus and/or an apparatus group 16 transmits apparatus information 2, it is read in via information input 22. First of all, an identification device 23 identifies a node 6, which is assigned to the apparatus part, the apparatus and/or apparatus group 16.

For this identified node 6, a second navigation path is calculated that connects identified node 6 to start node 13. This is accomplished in computer-implemented fashion, and thus automatically in a navigation-path calculating device 24. For identified node 6, it ascertains the superordinate node, for it the in turn superordinate node, and so forth on and on recursively until start node 13 is reached. The totality of the nodes passed through in so doing then forms the second navigation path.

First navigation path 12 and the second navigation path sectionally coincide. A computer-implemented node-selection device 25 ascertains the node for which no further node exists, that is both displayed for identified node 6, and is part of second navigation path 12. To this end, node-selection device 25 is equipped to ascertain the node 7 in the second navigation path to the identified node, for which no subordinate node in the second navigation path is displayed at the moment.

FIG. 2 shows, for example, the situation in which first navigation path 12 is shorter than the second navigation path and is contained completely in it. In other situations, the case occurs that first navigation path 12 is longer than the second navigation path and completely contains it. Finally, the case also occurs that the second navigation path branches off from first navigation path 12. For instance, in FIG. 1, this would be the case if the identified node were node 6 and the selected node were the node at which link 9 ends.

In FIG. 2, the ascertained node is therefore the node 7 in which apparatus information 2 is made visible.

Control device 27 drives an information-output device 26, by which apparatus information 2 is output with ascertained node 7, here on associated link 11 that ends at ascertained node 7.

If node 7, at which link 11 with apparatus information 2 ends, is selected by selection device 14, then this newly selected node 7 is displayed with its subordinate nodes.

Previously selected node 6 is automatically reduced to the representation in navigation path 12. In particular, nodes 7 subordinate to this node 6 are hidden, with the exception of selected node 7.

Since the displayed part of navigation tree 4 thus changes, the display is updated. To that end, in node-selection device 25, a node is once again ascertained which lies in the second navigation path and which is presently displayed. Node-selection device 25 ascertains this node so that for this node, no subordinate node exists that likewise satisfies these conditions.

Information-output device 26 erases apparatus information 2 at the previously displayed location and displays it at the newly ascertained node—in the example, again on the associated link.

In FIG. 2, a control device 19 is also illustrated that takes the form of command buttons. The associated apparatus part, the associated apparatus and/or associated apparatus group 16 for selected node 6 is/are controllable by control device 19. To that end, control device 27 is connected to the apparatus part, apparatus or apparatus group 16 in question via a control connection, e.g., via the bus mentioned or a further bus. Instead of control device 19 or in addition to it, in the case of individual or all nodes, information is displayable that is specific to the associated apparatus part, the associated apparatus and/or associated apparatus group 16. In one exemplary embodiment, control devices 19 are formed only in the case of nodes 5, 6, 7 for which no subordinate nodes exist.

Figure 3:
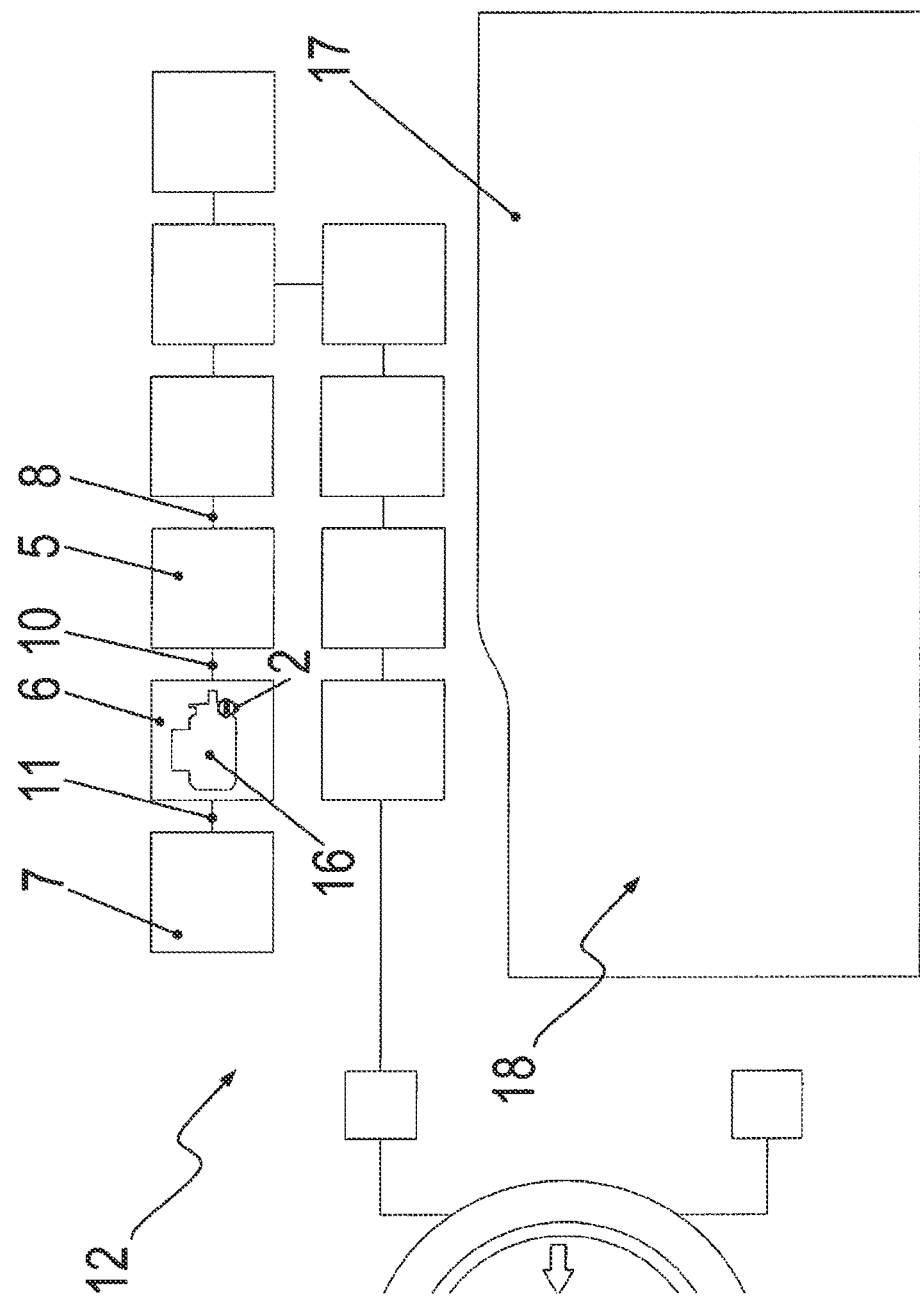
FIG. 3 shows a further representation of apparatus information in another part of a navigation tree in the case of a method according to an example embodiment of the present invention.

FIG. 3 shows a further situation which is possible when working with the method hereof. Components and functional units which are identical or substantially identical functionally and/or structurally to the previous figures are denoted with the same reference numerals and are not described again separately. Therefore, the explanations with regard to FIGS. 1 and 2 hold true here accordingly.

In FIG. 3, node 6 is selected which is assigned to a motor as apparatus 16. This apparatus 16 has transmitted apparatus information 2, e.g., an error message. This apparatus information 2 is displayed with node 6 in the manner already described.

In addition, using a read-out device 17, e.g., a mask, apparatus parameters 18 and other apparatus data of apparatus 16 (or of the apparatus part or apparatus group) are displayed.

Therefore, the user is immediately permitted an overview of possible causes for apparatus information 2 and/or of its significance.

It is also shown in FIG. 3 that not all branchings are blanked or hidden in navigation path 12. As of a certain hierarchical level, this is no longer necessary.

Figure 4:
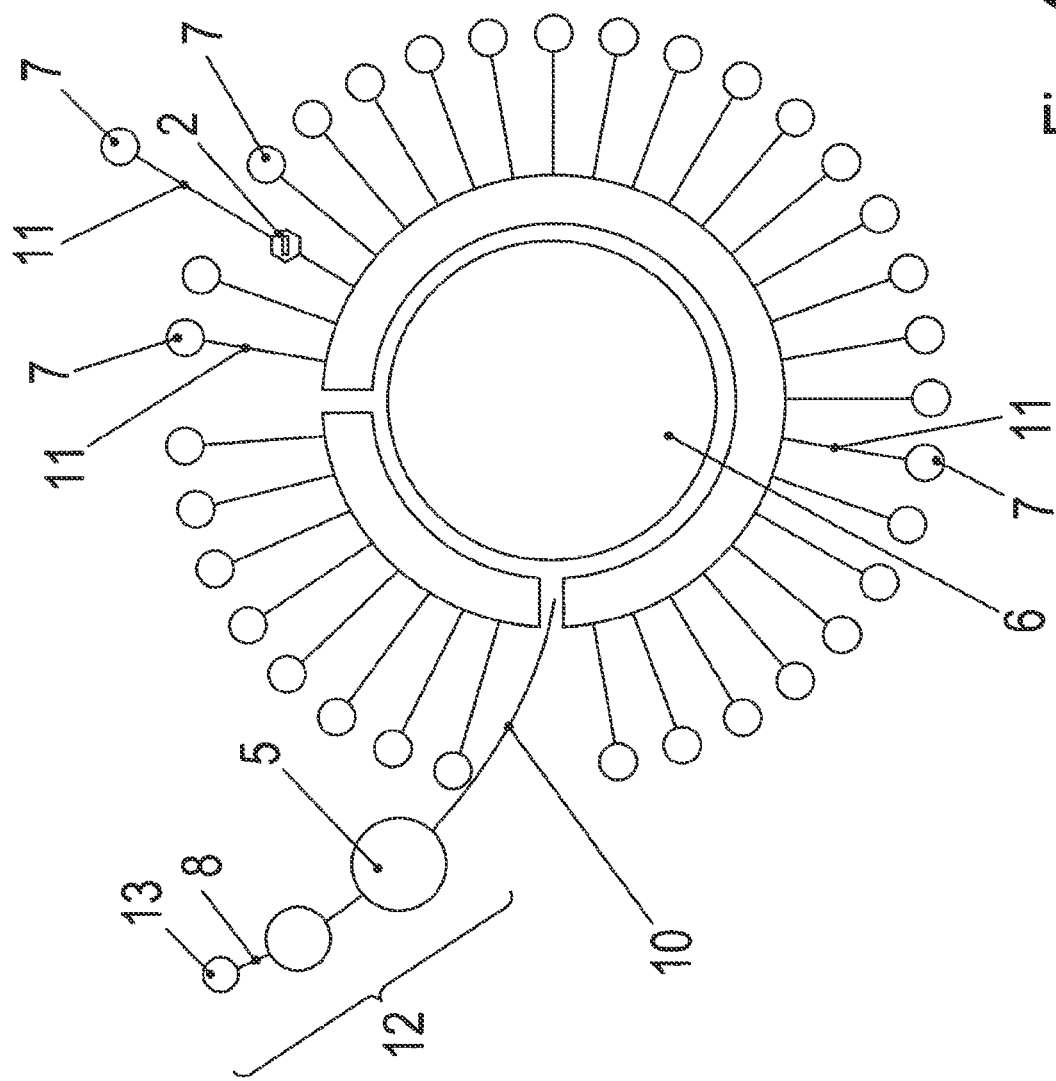
FIG. 4 shows another representation of apparatus information in a third part of a navigation tree in the case of a method according to an example embodiment of the present invention.

FIG. 4 shows a further situation which is possible when working with the method hereof. Components and functional units which are identical or substantially identical functionally and/or structurally to the previous figures are denoted with the same reference numerals and are not described again separately. Therefore, the explanations with regard to FIGS. 1 through 3 hold true here accordingly.

In FIG. 4, selected node 6 has so many subordinate nodes 7 (here thirty-four, illustratively) that these nodes 7 are displayable only in a concise, very reduced and downsized display form.

A node 7 with which apparatus information 2 is displayed is again ascertained in the manner described.

The exemplary embodiment differs from the previous exemplary embodiments in that, in addition to the display of apparatus information 2, node 7 is displayed enlarged compared to the remaining nodes subordinate to node 6. Information-output device 26 or another part of control device 27 brings this about automatically at the same time.

In the case of display device 1, it is provided to display device information 2 in a navigation tree 4, whose nodes 5, 6, 7, 13 are each assigned to apparatus parts, apparatuses and/or apparatus groups 16, such that apparatus information 2 with a node that is superordinate both with respect to the node which is assigned to a source of apparatus information 2, and with respect to a currently selected node 6.

LIST OF REFERENCE NUMERALS 1 display device
2 apparatus information
3 storage device
4 navigation tree
5, 6, 7 node
8, 9, 10, 11 links
12 navigation path
13 start node
14 selection device
15 display unit
16 apparatus group, apparatus, apparatus part
17 read-out device
18 apparatus parameter
19 control device
20 pointer
21 input device
22 information input
23 identification device
24 navigation-path calculating device
25 node-selection device
26 information-output device
27 control device

What is claimed is:

1. A system, comprising:
a non-transitory storage device adapted to store a navigation tree, the navigation tree including nodes that are interlinked by directional links, the directional links defining a hierarchical order structure that includes a plurality of nodes including a start node having no superordinate nodes, all nodes other than the start node having a superordinate node and being subordinate to the start node, the hierarchical order structure defining for each node an assigned navigation path that includes all superordinate nodes for the node and respective connecting links, each node being assigned an apparatus part, an apparatus, or an apparatus group of a plant which in each case transmits apparatus information; and
a display device adapted to display a node, selected via a selection device, of the navigation tree with an associated navigation path and the nodes directly subordinate to the node, to identify a node assigned to apparatus information received by an information input transmitted from the apparatus part, the apparatus, or the apparatus group, to ascertain and display an associated second navigation path for the identified node by recursively searching for each directly superordinate node between the identified node and the start node, to ascertain a node in the second navigation path to the identified node, which at the same time is also currently displayed on the display device, and to display the apparatus information with the ascertained node.

2. The system according to claim 1, wherein the display device is adapted to ascertain the node in the navigation path to the identified node, for which no subordinate node in the navigation path is currently displayed.

3. The system according to claim 1, wherein each node has exactly or no more than one directly superordinate node in the navigation tree and/or the display device is adapted to recursively, automatically ascertain one node directly superordinate in each case to a node, and to note the superordinate node as an element of the navigation path.

4. The system according to claim 1, wherein in response to a change of the selected node on the display device, the display device is adapted to again automatically ascertain a node currently displayed on the display device, in the navigation path of the identified node, and to display the apparatus information in a manner assigned to a newly ascertained node, and/or the display device is adapted to display the apparatus information on a link to a node that is directly superordinate to the ascertained node, and/or on the ascertained node.

5. The system according to claim 1, wherein the display device is adapted to display a graphic read-out adapted to read out apparatus parameters of the assigned apparatus part, apparatus, or apparatus group with the selected node.

6. The system according to claim 1, wherein the display device is adapted to display a graphic control adapted to control the assigned apparatus part, apparatus, or apparatus group.

7. The system according to claim 1, wherein the display device is adapted to display no more than two directly subordinate or superordinate nodes for each unselected node displayed.

8. The system according to claim 1, wherein the display device is adapted to automatically identify the node assigned to apparatus information received.

9. The system according to claim 1, wherein the display device is adapted to automatically ascertain and display the associated second navigation path for the identified node by recursively searching for each directly superordinate node between the identified node and the start node.

10. The system according to claim 1, wherein the display device is adapted to automatically ascertain a node in the second navigation path to the identified node, which at the same time is also currently displayed on the display device.

11. The system according to claim 1, wherein each node other than the start node includes a single directly superordinate node.

12. The system according to claim 1, wherein each node other than the start node includes not more than one directly superordinate node.

13. The system according to claim 1, wherein the display device is adapted to display not more than two directly subordinate or superordinate nodes for each unselected node displayed.

14. The system according to claim 1, wherein the apparatus information includes a status message, a command confirmation, an error message, an action instruction, and/or apparatus-specific information.

15. The system according to claim 1, wherein the display device is adapted to display the apparatus information as a symbol in the navigation tree.

16. A system, comprising:
a non-transitory storage device adapted to store a navigation tree, the navigation tree including nodes that are interlinked by directional links, the directional links defining a hierarchical order structure that includes a plurality of nodes including a start node having no superordinate nodes, all nodes other than the start node having a superordinate node and being subordinate to the start node, the hierarchical order structure defining for each node an assigned navigation path that includes all superordinate nodes for the node and respective connecting links, each node being assigned an apparatus part, an apparatus, or an apparatus group of a plant which in each case transmits apparatus information; and a display device adapted to display a node, selected via a selection device, of the navigation tree with an associated navigation path and the nodes directly subordinate to the node, to automatically identify a node assigned to apparatus information received by an information input transmitted from the apparatus part, the apparatus, or the apparatus group, to automatically ascertain and display an associated second navigation path for the identified node by recursively searching for each directly superordinate node between the identified node and the start node, to automatically ascertain a node in the second navigation path to the identified node, which at the same time is also currently displayed on the display device, and to display the apparatus information with the ascertained node.

17. The system according to claim 16, wherein the display device is adapted to ascertain the node in the navigation path to the identified node, for which no subordinate node in the navigation path is currently displayed.

18. The system according to claim 16, wherein each node has exactly or no more than one directly superordinate node in the navigation tree and/or the display device is adapted to recursively, automatically ascertain one node directly superordinate in each case to a node, and to note the superordinate node as an element of the navigation path.

19. The system according to claim 16, wherein in response to a change of the selected node on the display device, the display device is adapted to again automatically ascertain a node currently displayed on the display device, in the navigation path of the identified node, and to display the apparatus information in a manner assigned to a newly ascertained node, and/or the display device is adapted to display the apparatus information on a link to a node that is directly superordinate to the ascertained node, and/or on the ascertained node.

20. The system according to claim 16, wherein the display device is adapted to display a graphic read-out adapted to read out apparatus parameters of the assigned apparatus part, apparatus, or apparatus group with the selected node.

21. The system according to claim 16, wherein the display device is adapted to display a graphic control adapted to control the assigned apparatus part, apparatus, or apparatus group.

22. The system according to claim 16, wherein the display device is adapted to display no more than two directly subordinate or superordinate nodes for each unselected node displayed.

23. The system according to claim 16, wherein the display device is adapted to automatically identify the node assigned to apparatus information received.

24. The system according to claim 16, wherein the display device is adapted to automatically ascertain and display the associated second navigation path for the identified node by recursively searching for each directly superordinate node between the identified node and the start node.

25. The system according to claim 16, wherein the display device is adapted to automatically ascertain a node in the second navigation path to the identified node, which at the same time is also currently displayed on the display device.

26. The system according to claim 16, wherein each node other than the start node includes a single directly superordinate node.

27. The system according to claim 16, wherein each node other than the start node includes not more than one directly superordinate node.

28. The system according to claim 16, wherein the display device is adapted to display not more than two directly subordinate or superordinate nodes for each unselected node displayed.

29. The system according to claim 16, wherein the apparatus information includes a status message, a command confirmation, an error message, an action instruction, and/or apparatus-specific information.

30. The system according to claim 16, wherein the display device is adapted to display the apparatus information as a symbol in the navigation tree.

* * * * *